United States Patent
Thomas et al.

(10) Patent No.: US 9,493,112 B2
(45) Date of Patent: Nov. 15, 2016

(54) AMBIENT LIGHTING SYSTEM TO MITIGATE THE IMPACT OF TRAVEL ACROSS TIME ZONES

(71) Applicant: The Boeing Company, Chicago, IL (US)

(72) Inventors: Lisa C. Thomas, Kirkland, WA (US); Richard J. Loftis, Arlington, WA (US); Andrew L. Armatorio, Everett, WA (US); Colin W. Hart, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 46 days.

(21) Appl. No.: 14/564,056

(22) Filed: Dec. 8, 2014

(65) Prior Publication Data
US 2016/0159276 A1 Jun. 9, 2016

(51) Int. Cl.
*B60Q 1/26* (2006.01)
*B60Q 3/02* (2006.01)
*B64D 11/00* (2006.01)

(52) U.S. Cl.
CPC .......... *B60Q 3/0293* (2013.01); *B60Q 3/0279* (2013.01); *B64D 11/00* (2013.01); *B64D 2011/0053* (2013.01)

(58) Field of Classification Search
CPC ..................................................... H05B 33/08
USPC ............. 315/291, 307, 209 R, 76–80
See application file for complete search history.

(56) References Cited

U.S. PATENT DOCUMENTS

| 8,453,651 | B2 | 6/2013 | Pederson et al. | |
| 2002/0159270 | A1* | 10/2002 | Lynam | B60K 35/00 362/492 |
| 2005/0253533 | A1* | 11/2005 | Lys | H05B 33/0815 315/224 |
| 2012/0206050 | A1* | 8/2012 | Spero | B60Q 1/04 315/152 |
| 2014/0278229 | A1* | 9/2014 | Hong | A61B 5/7455 702/160 |

FOREIGN PATENT DOCUMENTS

WO 2014067931 A1 5/2014

OTHER PUBLICATIONS

Effects of Exterior Lighting on Human Health, Position Statement, Illuminating Engineering Society of North America, as early as Sep. 2014.

* cited by examiner

*Primary Examiner* — Minh D A
(74) *Attorney, Agent, or Firm* — MH2 Technology Law Group LLP (57) ABSTRACT

A system and method for a customized ambient lighting environment for individuals in vehicles travelling rapidly across multiple time zones, that can be automated and/or based on user input and which allows each user to be exposed to light in accordance to selected preferences and circumstances, in order to begin acclimating the user to a new time zone, or avoid acclimating to a new time zone, and/or otherwise mitigate circadian desynchrony.

17 Claims, 8 Drawing Sheets

AMBIENT LIGHTING SYSTEM TO MITIGATE THE IMPACT OF TRAVEL ACROSS TIME ZONES

FIELD

The present disclosure relates to technology for reducing the adverse impact on users, such as passengers, in vehicles, such as aircraft, traveling rapidly across time zones, and more particularly to technology for reducing the impact on a passenger of adjusting to a new time zone.

BACKGROUND

There is a retinal receptor called "melanopsin" that detects light and uses it to help regulate melatonin production, which is involved in initiating the sleep cycle in a human. Visible light, including wavelengths from approximately 390 nm to approximately 700 nm on the electromagnetic radiation spectrum, is known to have measurable effects on the melanopsin receptors. Additionally, the duration of light exposure, the intensity of light, and the time of day during which the exposure occurs contribute to the regulation of the circadian rhythm in humans. As a result, the human circadian rhythm may be advanced or delayed by manipulation of light exposure.

The body's natural circadian rhythms, which are mediated by local day/night cycles and exposure to light, become disrupted when the day/night cycle at a new location, subsequently referred to as "Destination," does not match the day/night cycle from a previous location to which the body is still acclimated, subsequently referred to as "Origin." This effect is called circadian desynchrony, including the effect known colloquially for air travel, as "jet lag," and occurs when a person, such as a passenger or crew member, travels across a number of times zones in a period of time that is shorter than the body's ability to acclimate to the Destination time zone. The natural adjustment to a Destination time zone takes approximately one day for every time zone crossed, but can take longer or shorter depending on the individual. On average, if a person has rapidly travelled across three time zones to a Destination, it will take approximately 3 days before that person's circadian rhythm readjusts to the new day/night light cycle. Resulting effects of such disruption include excessive sleepiness or inability to sleep, decreased appetite, and general malaise. The circadian desynchrony exists as soon as the user is out of his/her acclimated day/night cycle time zone.

For example, if a passenger flies from an Origin city in the US Central Time Zone at 7:00 AM to London, England, the arrival time of 9:00 PM time at the Destination (London) is the equivalent of 3:00 PM Central at the Origin. The passenger's body will be expecting up to 6 additional hours of daylight that is not available at the Destination, and this sudden loss of daylight may have an effect on the circadian rhythm of the passenger.

Existing solutions include trying to speed up the adjustment to a new time zone by forcing the body into a new sleep/wake schedule in advance of the trip or taking supplemental doses of melatonin or other sleep aids or stimulants. Melatonin supplements and other sleep aids or stimulants can have negative side effects and limited usefulness. New sleep/wake schedules are not every effective since they conflict with the pattern of light exposure in the Origin, to which the body is still acclimated.

A passenger on any vehicle, such as an aircraft, that will result in a time zone change from Origin to Destination may experience jet lag. For time zone changes of less than three hours, there are typically minimal effects that are resolved in one to two days and do not significantly disrupt sleeping and eating schedules and contribute to significant feelings of discomfort or malaise. For time zone changes of three or more hours, the negative effects of jet lag are more pronounced and the effects of light-induced mitigation are greater. A system and method are proposed to mitigate the impact of jet lag associated with disruptions in circadian rhythms that users such as passengers, experience after long flights, particularly those that cross time zones that result in a rapid shift in time greater than or equal to three hours.

SUMMARY

The technology and its various implementations disclosed herein, provides a customized ambient lighting environment for travelers also referred to as "users," such as passengers in a vehicle traveling rapidly across time zones that can be automated and/or based on user inputs and which allows each user to be exposed to light in accordance with selected preferences in order to mitigate disruptions in circadian rhythms. A customized ambient lighting system allows for the provision of light that closely simulates the ambient light exposure in a desired time zone. The lighting may be adjusted such that it emits selected wavelengths such as those that are more blue-toned, red-toned or green-toned, at appropriate times, and in accordance with the desired time zone's day/night light exposure cycle. The lighting may also be organized such that the light projection angle and intensity of the light changes over the course of a simulated "day." These characteristics provide the user's body with the experience of day/night light exposure in the desired time zone.

Travelers such as passengers on an aircraft flight, may have different destinations and different lengths of stay in their respective destinations, such that each individual user may have different requirements for lighting to mitigate circadian desynchrony. For example, if the traveler is only remaining at the Destination for a short period before returning to the Origin time zone, then the user may desire to maintain their acclimation to the Origin time zone for the additional duration of travel, and may use the lighting system to aid in resisting acclimation to the Destination time zone. This may be accomplished by the user selecting a light exposure corresponding to the Origin time zone during the travel. Light exposure can comprise various components including the duration a light is emitting on an individual or object, the intensity of the light being emitted, the angle in which the light is being emitted and the wavelength of the light being emitted. Also, each of the components—intensity, light projection angle and wavelength, can vary over time during the duration of the light exposure thereby providing a light exposure profile. If, however, the desired time zone is the Destination time zone, or any new time zone other than the Origin time zone, the user may use the lighting system to begin acclimating to a new day/night light exposure cycle matching the desired time zone, while still in transit, by selecting the Destination or other time zone to determine the lighting characteristics. This effectively reduces the acclimatization time for the user to the new time zone.

The light source can be adjustable for one or more of a duration, an intensity level, a light projection angle, or a light wavelength or combination of wavelengths. In one implementation, each of the characteristics of the light can be manually defined through user input, for example by a passenger or crew member. In another implementation, the light can be automatically defined, for example by selecting a time zone that has pre-defined criteria for each of the characteristics.

Lighting sources can include light sources emitting light directed generally to an area where the head of a typical user would be located, and can include sources emitting light directed more specifically, for example in a beam, to an area where the head or eyes of a typical user would be located. For regular passenger seats, light sources may, for example, be located in the seat back in front of the passenger and on the bottom of the overhead carry-on compartment, or other locations.

One implementation can also include a computer driven graphical user interface that is displayed on a monitor for user viewing and that provides a user input device which can be implemented using one or more of a touch screen interface, a keyboard interface, and a keypad interface. The interface may allow the user to choose one of a set of options including, for example, the option to control the characteristics of the light manually, or the option to enable an automated lighting program with pre-defined lighting characteristics based on a selection of a desired time zone for acclimatization.

One implementation of the technology as disclosed, is a system for providing light exposure to mitigate the impact of time zone changes. The system can include a user area having a user seating position. The user seating position can also be a reclining or flat position, for example on a travel bed or bunk. One or more light sources can be configured to direct the emitted light toward the user seating positions, where the light source can be adjustable for one or more of a duration, an intensity level, a light projection angle, or a light wavelength or combination of wavelengths. The light can also be provided as diffuse light. A user input can be configured to selectively control an adjustment of the light source for an adjustment of one or more of a duration, an intensity level, a light projection angle, and a light wavelength or combination of wavelengths. The process can also include selectively adjusting the beam to simulate any selected time zone.

In another implementation the seating area can include a plurality of the seating positions each having a separate light source configured to direct a separate projection of light respectively, toward each of the plurality of the seating positions. The light source can be configured with baffles or shields or curtains designed to absorb a portion of the light projected outside of a predetermined angle of projection to avoid projecting light on any adjacent seating positions.

Another implementation of the technology as disclosed is a method for providing light exposure to mitigate the impact of travel across time zones. The method can include the process of directing light toward a user area, where the light source can be adjustable for one or more of a duration, an intensity level, a light projection angle, and a light wavelength or combination of wavelengths. The method can further include the process of selectively controlling an adjustment of the light source for an adjustment of one or more of a duration, an intensity level, a light projection angle, and a light wavelength or combination of wavelengths, to simulate any selected time zone.

The features, functions, and advantages that have been discussed can be achieved independently in various implementations or may be combined in yet other implementations, further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which.

DETAILED DESCRIPTION

While the technology as disclosed, is susceptible to various modifications and alternative forms, specific embodiments thereof are shown by way of example in the drawings and will herein be described in detail. It should be understood, however, that the drawings and detailed description present herein are not intended to limit the technology as disclosed to the particular implementation disclosed but on the contrary, the intention is to cover all modifications, equivalents, and alternatives falling within the spirit and scope of the present technology as disclosed and as defined by the appended claims.

The proposed system could be used for time zone changes of less than three hours, but may provide reduced benefits compared to its use to support time zone changes of three or more hours. The lighting system reduces the adjustment time by presenting the new time zone's day/night light cycle to the user before they physically arrive at the new time zone. When they arrive, their circadian desynchrony is less than it otherwise would be, because their body has already begun the adjustment and is closer to being in the rhythm of the new day/night ambient light cycle. Thus, the negative effects of predicted circadian desynchrony are mitigated compared to a non-light-assisted user.

According to the implementation(s) of the present technology as disclosed, various views are illustrated in FIG. 1-4 and like reference numerals are being used consistently throughout to refer to like and corresponding parts of the technology as disclosed for all of the various views and figures of the drawings. Also, please note that the first digit(s) of the reference number for a given item or part of the technology as disclosed should correspond to the Figure number in which the item or part is first identified.

One implementation of the present technology comprising a system and method for light exposure teaches a novel apparatus and method for mitigating the circadian desynchrony that results in a passenger from rapidly crossing time zones.

Figure 1:
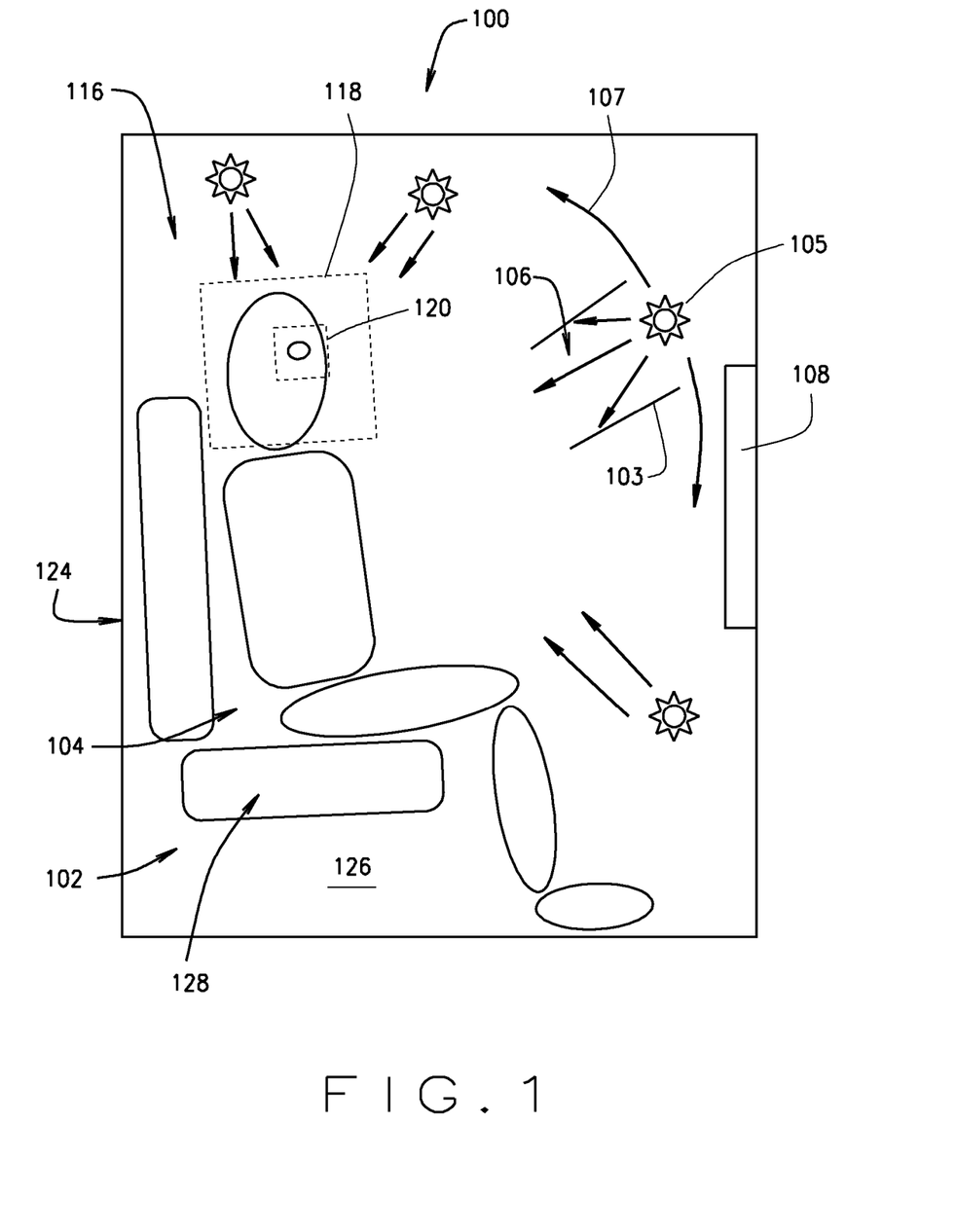
FIG. 1 is an illustration for providing a light exposure.

The details of the technology as disclosed and various implementations can be better understood by referring to the figures of the drawings. Referring to FIG. 1, a system 100 for providing light exposure to a user in a vehicle, in order to mitigate the impact of time zone changes, is illustrated. The system includes a user area 102 having a seating position 104. The user seating position can also be a reclining or flat position, for example on a travel bed or bunk.

The light used in the present technology can be visible light including wavelengths from approximately 390 nm to approximately 700 nm on the electromagnetic radiation spectrum. The length of time of light exposure is referred to herein as "duration" of light exposure. The entire presentation to the user of light representing a day/night light cycle, or portion thereof, that is determined by a time zone selection is referred to herein as the light "exposure cycle."

A light source 105 as illustrated can be configured to direct a beam 106 of light toward the seating position 104 and where the light source 105 is adjustable for one or more of a light duration, an intensity level, a light projection angle or a light wavelength or combination of wavelengths. The light may be emitted as diffuse light or as a beam of light. A user input interface 108 can be configured to selectively control, either manually or automatically, an adjustment of the light source 105 for one or more of the light exposure duration, the intensity level or the light wavelength or combination of wavelengths. Once a user has selected an adjustment criteria, the light emitting source can be automatically controlled to emit a programmed light exposure cycle, whereby the cycle can include the automatic adjustment of duration, intensity level, wavelength and light projection angle. Duration refers to the duration of light exposure for each instance of a light with a specific intensity level, wavelength, and light projection angle. The light exposure cycle can also include periodic changes to intensity level, wavelength, and light projection angle, such that the cycle provides an overall lighting profile over a given period of time.

The light can be a narrowly focused beam 106 to illuminate a predetermined area 116 of the user seating position 104. The predetermined area 116 can be one or more of a predetermined user head-box area 118 and a predetermined user eye-box area 120. The light source 105 can be adjusted for its angle of projection towards the user area 102 as indicated by the directional arrows 107. The source 105 can be equipped with baffling 103 to reduce the projection of light from the source 105 so that the light projection does not spill over into undesired areas of the user area 102 or to adjacent seating areas. The user area 102 can be partially or fully enclosed in a compartment 124 enclosing a volume 126 where the user is supported by a support member 128 which may be a seat, bed or other surface.

Figure 2A:
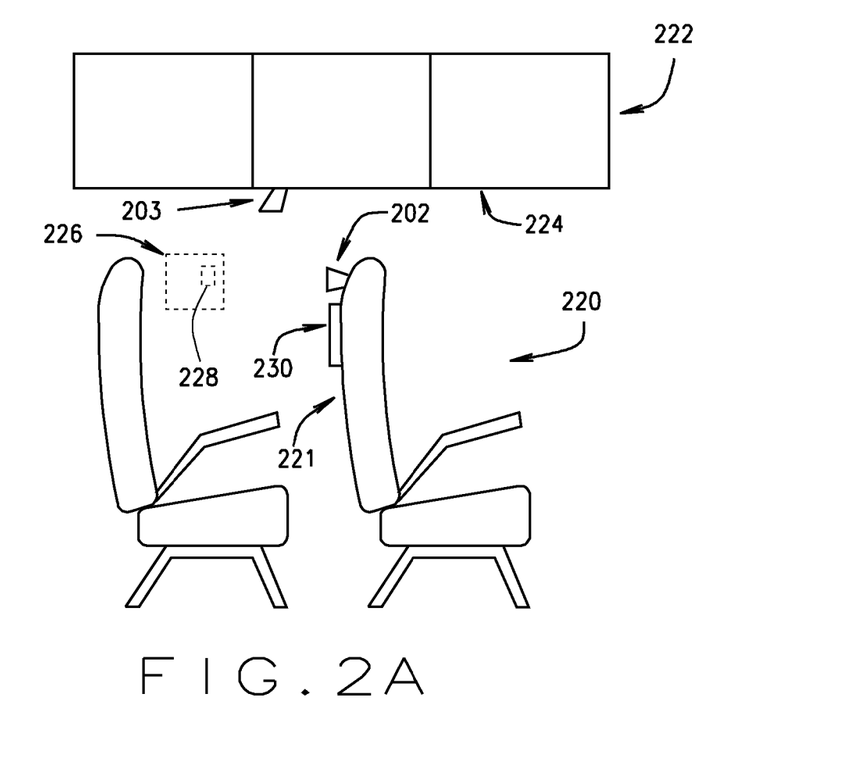
FIG. 2A is an illustration of a light source in a user environment that is a user seating area.
Figure 2B:
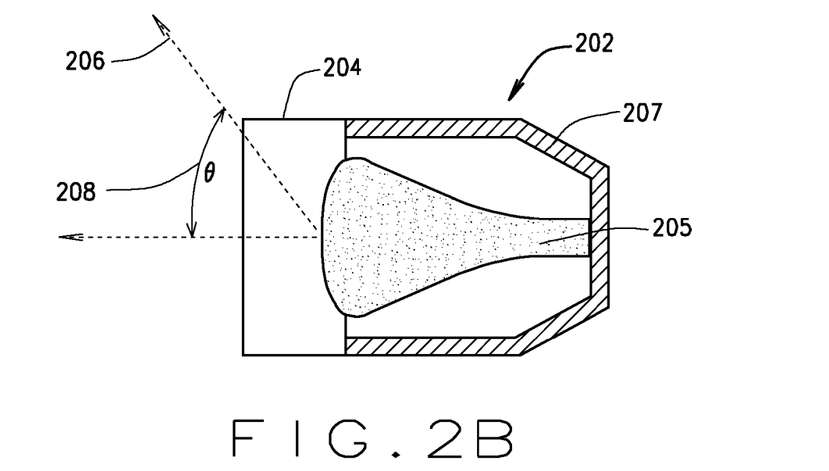
FIG. 2B is an illustration of a light source with baffling.
Figure 2C:
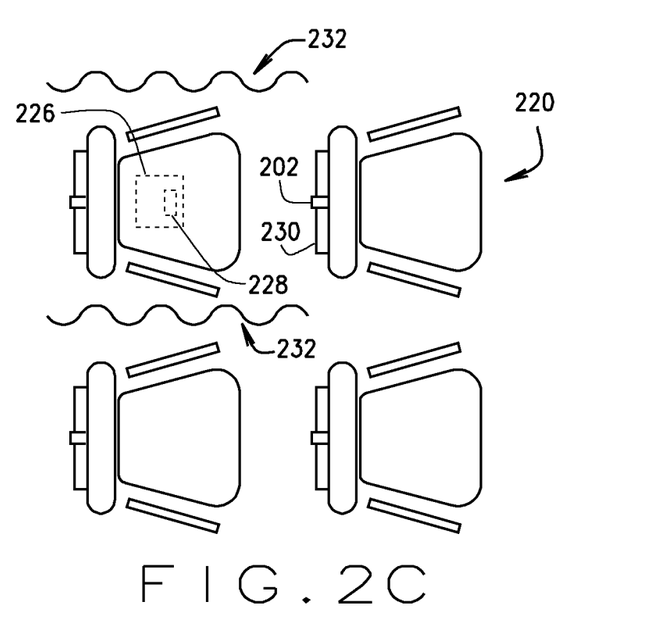
FIG. 2C is another view of the illustration of a light source in a user seating area.
Figure 2D:
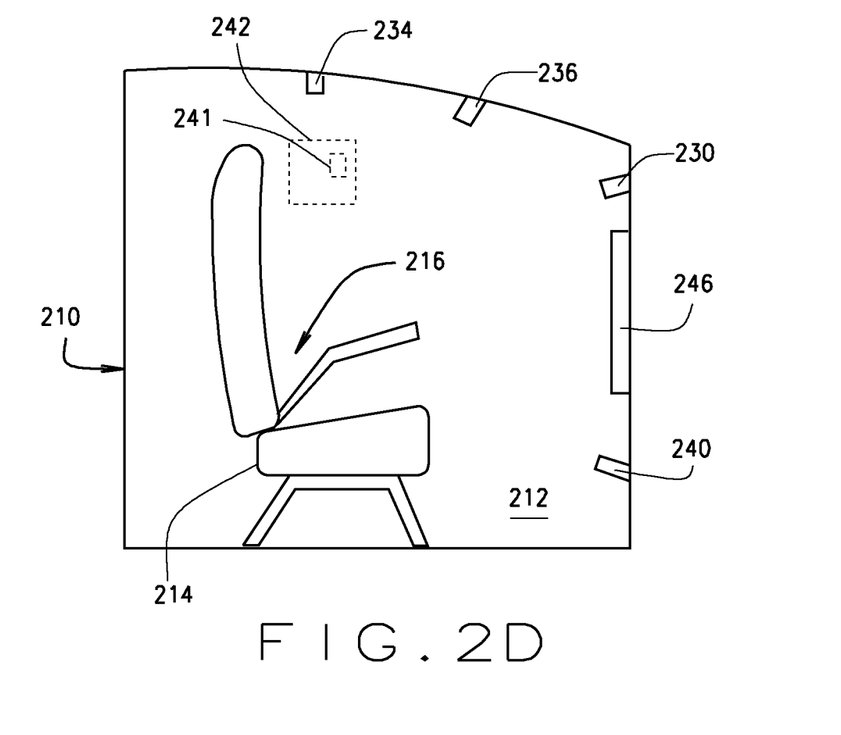
FIG. 2D is an illustration of a passenger seating compartment.

Referring to FIGS. 2A, 2B, 2C and 2D the light source 202 can be configured with baffles 204 or shields or curtains designed to absorb a portion of the light 206 projected outside of a predetermined angle of projection 208 to avoid projecting light on any adjacent seating positions or on any undesired areas of the user seating area 220. However, for one implementation of the technology as disclosed, the passenger seating area can be within a compartment 210 forming a partially or fully enclosed volume 212 for an individual passenger seating position 216 having a passenger support member 214. As seen in FIGS. 2A and 2C, a standard passenger seating area 220 is illustrated.

The user area can include a plurality of seating positions each having a separate light source configured to direct a separate emission of light respectively toward each of the plurality of the seating positions (not shown). The light source can be configured with baffles 204 or shields or curtains as described above, designed to absorb any portion of the light 206 projected outside of a predetermined angle of projection, to avoid projecting light on any adjacent seating positions.

The passenger seating area 220 can include a carry-on compartment 222 having an underside 224. Light sources 203 and 202 can be positioned on the underside of the carry-on compartment 222 and on the seat back 221 respectively, or other locations. The sources 203 and 202 can be configured to project light toward one or more restricted areas such as eye areas or head areas; including a head-box 226 and an eye-box 228. A user input interface 230 can also be position on the seat back. Curtains 232 can be configured to restrict any light over spill into an adjacent seating position.

FIG. 2B illustrates a light source 202 including a light emitting element 205 and a housing 207. The source 202 can include a baffle 204 to prevent light 206 emissions that go outside of a predetermined angle 208. This source configuration can be utilized on the seat back 221 the carry-on compartment 222 or within the seating compartment 210.

FIG. 2 illustrates a passenger compartment 210 enclosing an area 212 within which is a passenger seat 216. Multiple light sources 234, 236, 230 and 240 can be utilized without concern of light spill over into adjacent areas, when implementing the user compartment configuration. The multiple light sources 234, 236, 230 and 240 can be integrated to provide a more overall ambient lighting environment. Each of the light sources can be directed toward a head-box area 242 and/or an eye-box area 241. The seating compartment 210 can also include user input interface 246.

Figure 3A:
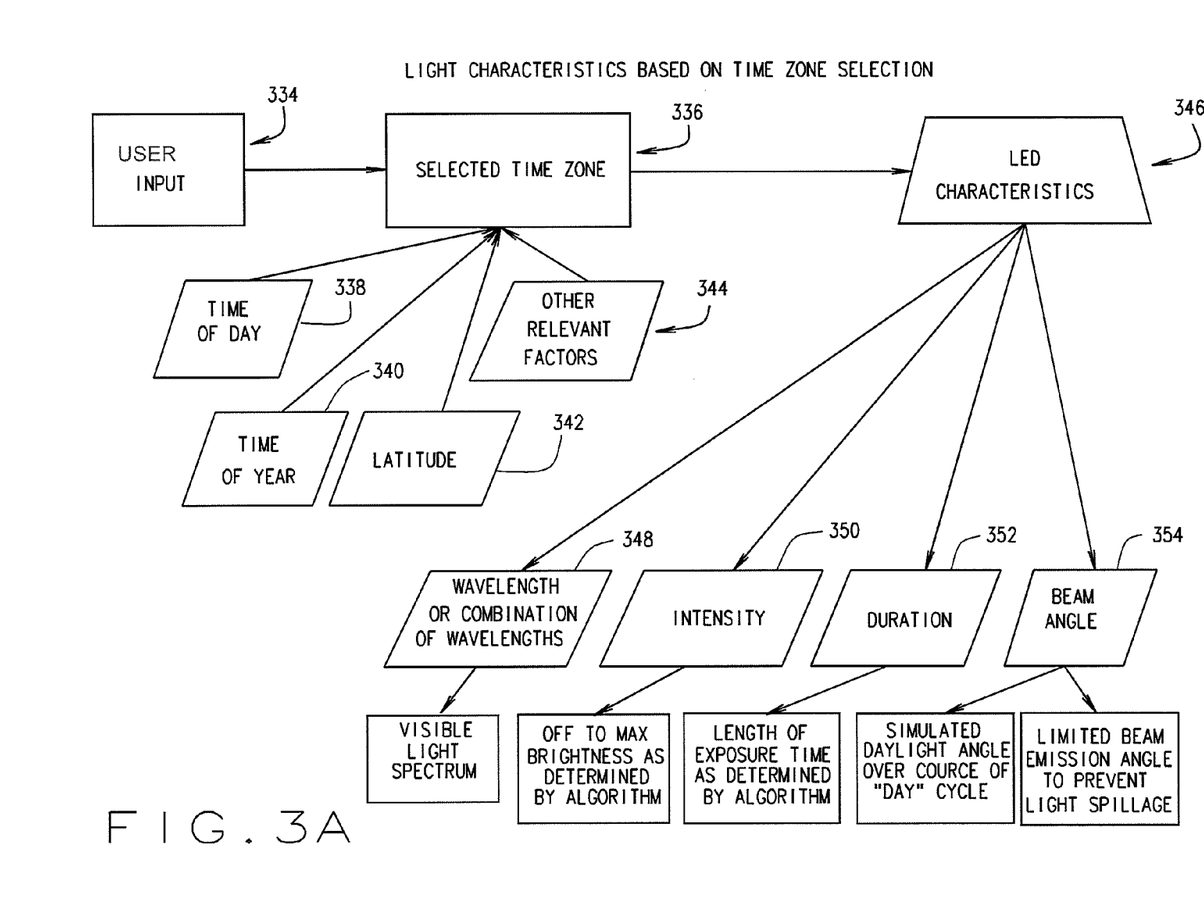
FIG. 3A is an flow chart for determining light characteristics based on time zone selection.

The flow chart showing the manner in which the lighting characteristics are determined for any selected time zone is illustrated in FIG. 3A. The user provides a user input 334 to a user interface 302. If the user input is a selected time zone 336, then various parameters are retrieved to implement the appropriate light exposure such as time of day 338, time of year 340, latitude 342, and other factors 344, for example urban, rural, weather trends, and the like. The light source 346 programming characteristics are thus determined which can include wavelength or combination of wavelengths 348, intensity 350, duration 352, and light angle 354. The time zone parameters of time of day 338 and other factors 344 may change over the course of the flight and the associated characteristics 348, 350, 352 and 354 can change accordingly. Although the light exposure cycle can be continuous over a cycle, the duration of each cycle can vary. Further within or during an exposure cycle or exposure profile a light may have a plurality of ON and OFF durations and/or a variety of intensity levels and/or wavelengths.

Figure 3B:
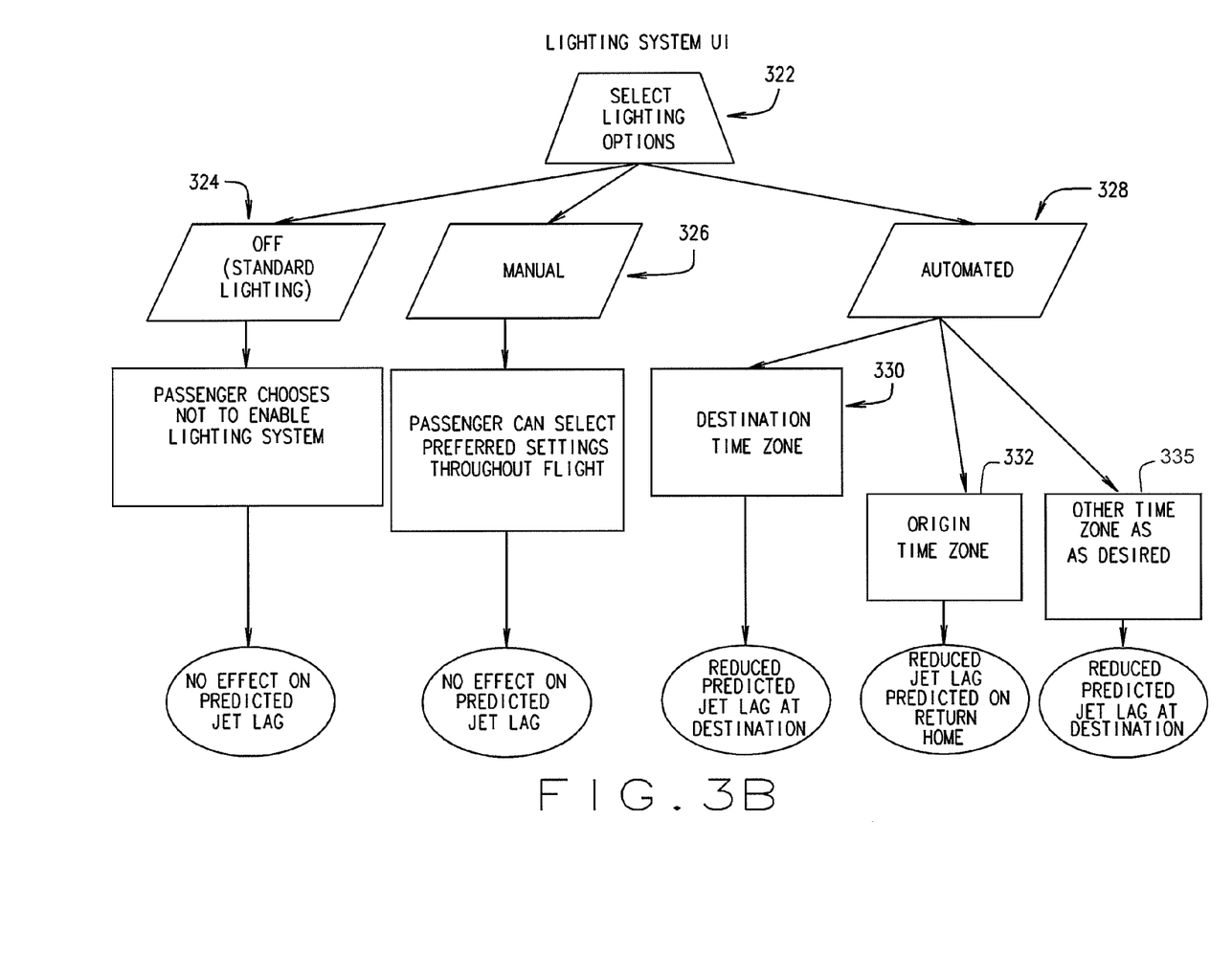
FIG. 3B is an illustration of the lighting system user interface flow.

FIG. 3B describes the lighting system user interface flow in an implementation. The user may select lighting options 322 via a user interface 302. The options comprise OFF 324, which disables the lighting system, unless or until the user chooses another option at some point, MANUAL 326, which allows the user to manipulate the lighting characteristics independently, and AUTOMATED 328, which uses a subsequent time zone selection to determine the lighting characteristics, according to the flow chart illustrated in FIG. 3A. The selection of a time zone can be characterized as a Destination Time Zone 330 which allows for the reduction of predicted circadian desynchrony at the Destination, an Origin Time Zone 332, which enables the passenger to reduce predicted circadian desynchrony at the eventual return to the Origin, or Other Time Zone 335 which represents the time zones not otherwise identified as Destination or Origin, and which the user may choose to select.

Figure 3C:
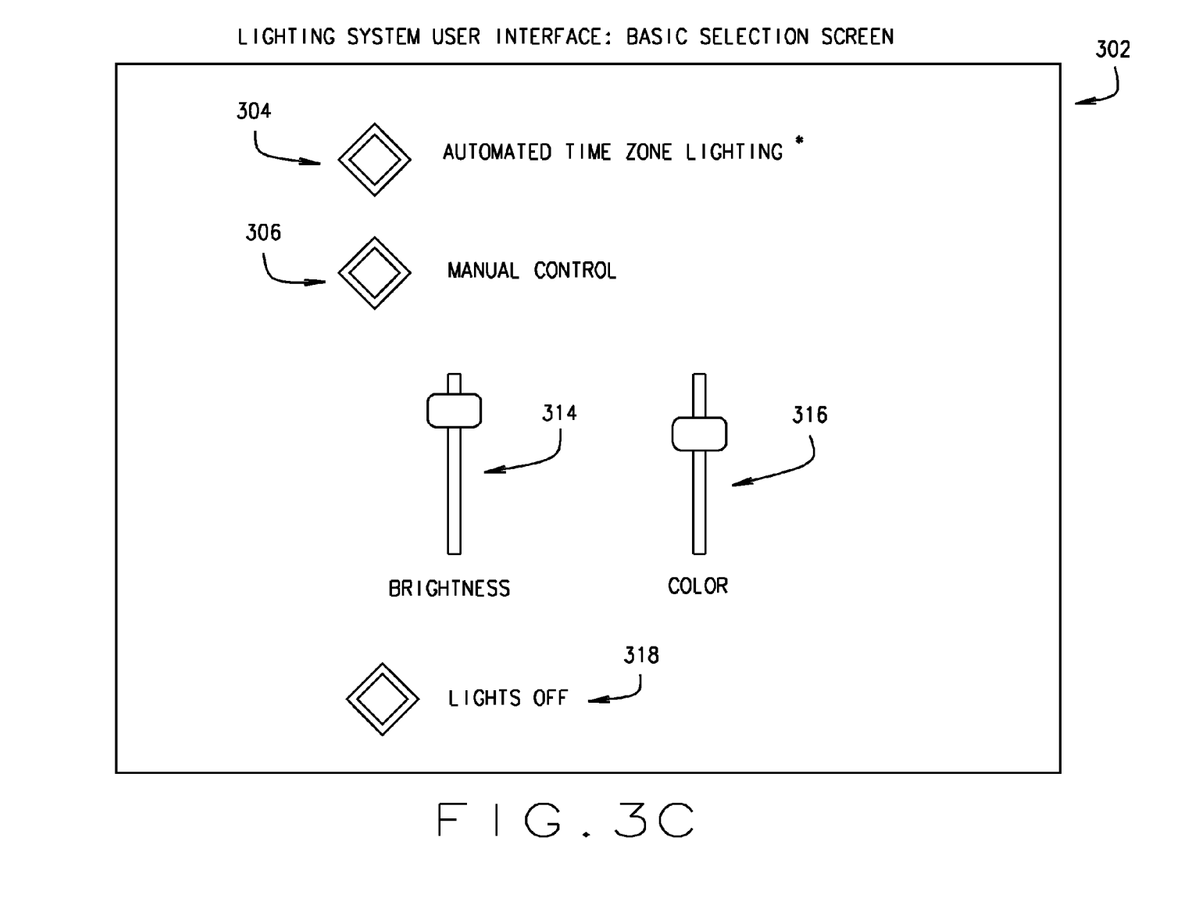
FIG. 3C is an illustration of a user input interface.
Figure 3D:
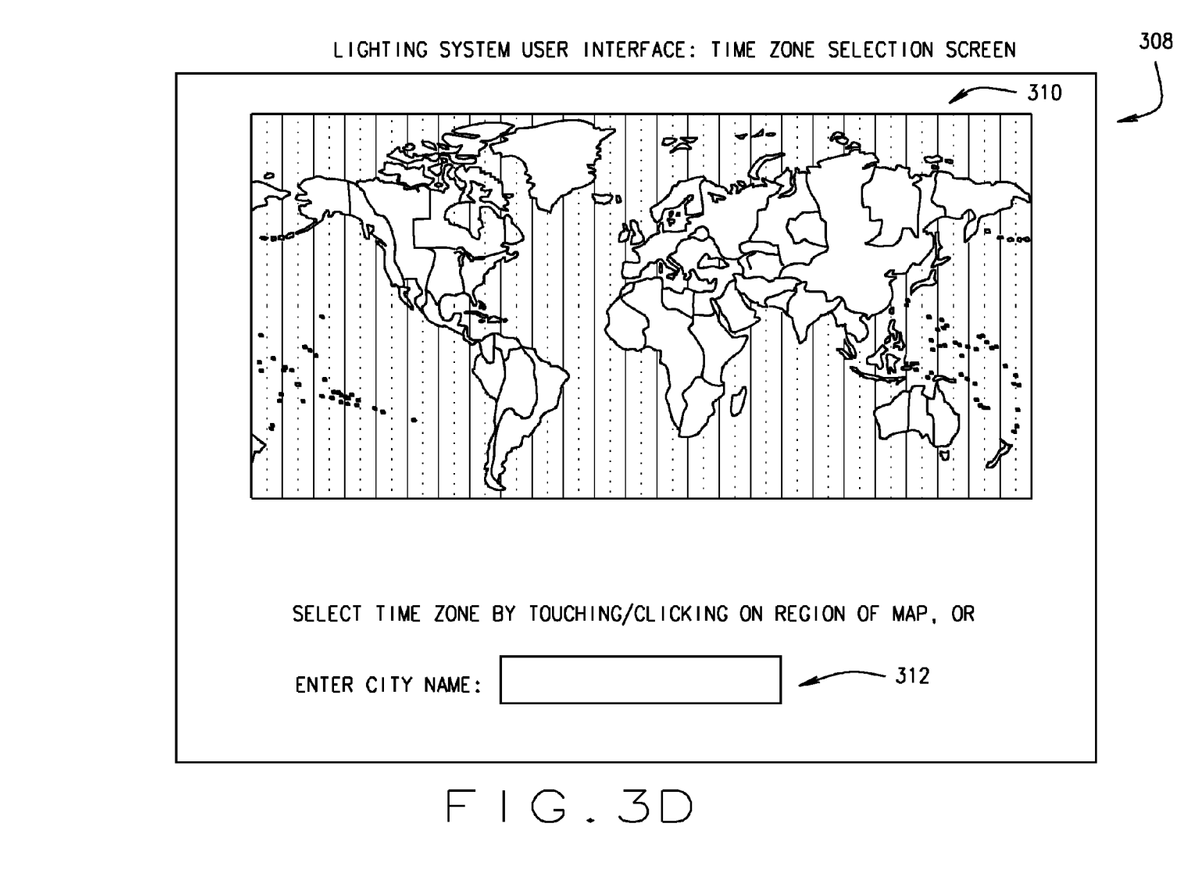
FIG. 3D is an illustration of a subpage of the user input interface.

One implementation of a lighting system user interface is illustrated in FIGS. 3C and 3D. The user interface 302 can contain mutually exclusive options for Automated Time Zone Lighting 304, Manual Control 306, and Lights Off 318. If the user input 334 is Automated Time Zone Lighting 304 the user is further prompted as illustrated in FIG. 3D for a time zone selection 336, for example, by choosing a graphically depicted time zone 310 from a world map 308 or by entering a city or location name 312. This time zone selection 336 then determines the lighting characteristics 346 via the flow chart illustrated in FIG. 3A. If the user input 334 is Manual Control 306, the user is able to directly manipulate the light characteristics through the use of for example slider bars to control Brightness 314, Color 316 or other control devices related to other light characteristics. If the user input 334 is Lights Off 318, the lighting system 100 is disabled unless or until the passenger selects either the Automated Time Zone Lighting 304 or Manual Control 306 options.

Figure 4:
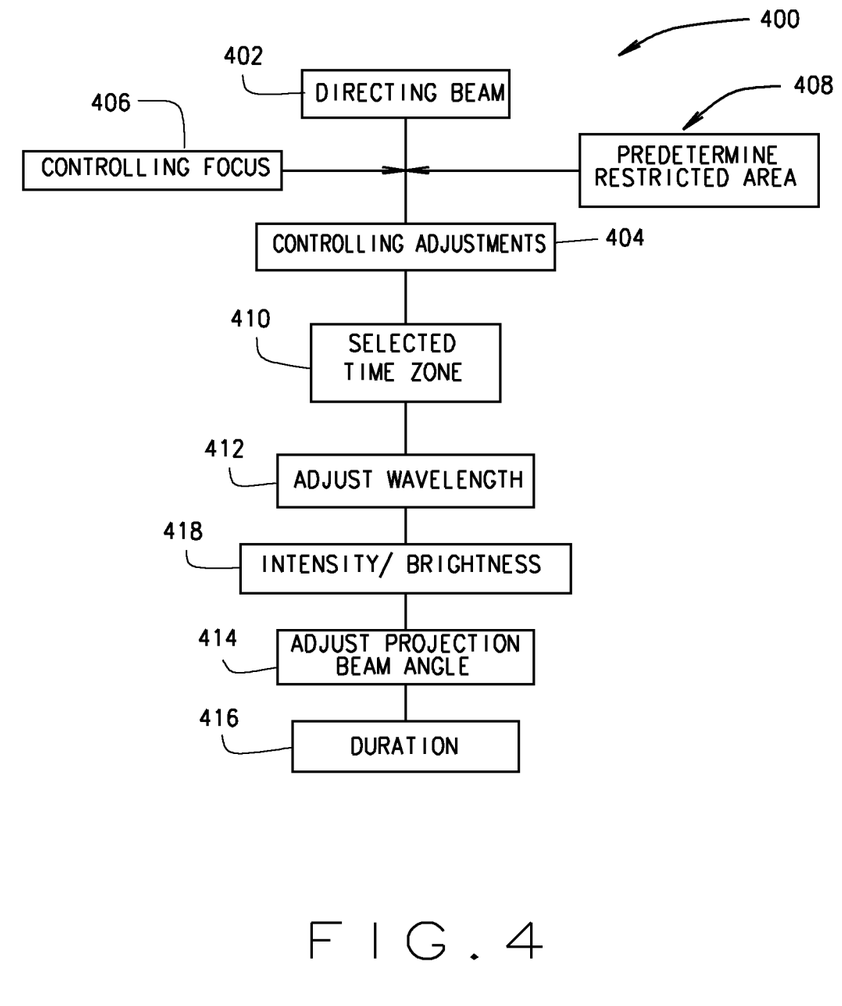
FIG. 4 is an illustration of the method to provide light exposure designed to mitigate circadian desynchrony.

Referring to FIG. 4, one implementation of the technology is system 400 for providing light exposure to mitigate the impact of time zone changes, which can include the process of directing a beam of light 402 toward a user seating area 220 where said beam of light is adjustable for one or more of a duration, an intensity, a light projection angle and an light wavelength or combination of wavelengths. The system can further include selectively controlling an adjustment 404 of the beam of light for one or more of the duration 416, the intensity 418, the light projection angle 414 with respect to a user seating area 220 and the light wavelength or combination of wavelengths 412 to simulate the current light level at the Selected Time Zone 410. The user seating area 220 can also be referred to as a passenger seating area 220. The system for directing the beam of light can include narrowly focusing 406 the beam of light to project and illuminate a predetermined area 408 of the user seating position 216. The predetermined area is one or more of a predetermined user head box area 226, is the typical position of a volume within which a passengers head is position and a predetermined user eye box volume 228.

In one implementation, baffling the emitted light can be accomplished with baffles 204 designed to absorb and/or block a portion of the light projected outside of a predetermined angle. Yet another implementation can include selectively controlling the adjustment of the light emitted for the duration 416 to adjust to a duration predetermined to simulate light for a selected time zone.

In yet another implementation of the technology the process can include selectively controlling the adjustment of the beam of light for the light wavelength or combination of wavelengths 412 to adjust to a light wavelength or combination of wavelengths predetermined to simulate light for a selected time zone, where selectively controlling an adjustment of the beam of light includes adjusting the light wavelength to one or more of a red, a blue and a green wavelength or other wavelengths. The process can further include selectively controlling the adjustment of the emitted light for the light projection angle 414 to adjust to a light angle with respect to the user's body and head-box volume predetermined to simulate light of a selected time zone.

When using the current technology, if the user is traveling rapidly across, for example, three or more time zones, and is staying in the Destination time zone for more than three days, then the user may want to begin adjusting to the Destination time zone as soon as possible, by utilizing the proposed technology during the intervening legs of travel, and thus reducing the predicted circadian desynchrony at the Destination time zone. Unassisted, the user may require as long as 24 hours or more to adjust for every hour difference between the user's Origin time zone and the destination time zone. If the user remains in the Destination time zone for less than three days, the passenger may want to remain on their Origin time zone, therefore the technology can be used to assist in maintaining the user on the Origin time zone during travel. Selecting Origin Time Zone light exposure will help the user remain acclimated to the Origin time zone, supporting the body's natural response to the accustomed day/night light exposure cycle. By using the technology as disclosed, the user can reduce any circadian desynchrony upon return to the Origin time zone because less adjustment to the new time zone was made in the intervening period of time.

The passenger may also wish to select a third, or Other, time zone, that is neither the Origin nor the Destination time zone for a variety of reasons. For example, if the passenger on one flight between Origin and Destination will eventually be travelling to yet another location with a different time zone, the user may wish to begin acclimating to the new location during the travel between the Origin and Destination time zones. By using the technology as disclosed, and selecting time zone exposure, the user may reduce any resulting circadian desynchrogy by beginning the process of acclimating to the new time zone during the travel between the Origin and Destination zones. Further, the user can set the lighting system to a selected time zone in both the initial Origin to Destination travel and the subsequent Destination to a new time zone to support acclimating to the new time zone.

The lighting for the technology as disclosed can be provided by LEDs or other lighting technology capable of producing specific wavelengths or combinations of wavelengths (e.g., blue to simulate morning light, red+green to simulate late afternoon light), or by altering a light source to provide light of a desired wavelength, for example by using color filters. The technology can also adjust as needed based on latitude, time of day, time of year, Daylight Saving Time, and/or other factors.

The one or more light sources can have an electronic control interface connected to and controlled by a controller or other computing device, where the controller is configured to control the duration, the intensity (from zero intensity or OFF to maximum intensity), the angular position of the source and resultant light projection angle, and/or the wavelength or combination of wavelengths of the light from the light source. The system can be automated based on the user's input to control the lighting system to perform an exposure cycle adapted to assist a user to acclimate to the selected time zone. The lighting exposure cycle can be programmed to include continuous adjustments to intensity, wavelength or combination of wavelengths, duration and/or light projection angle to mimic natural daylight or night time light exposure at the selected time zone. A single light source can be utilized having an adjustable wavelength or multiple light sources can be utilized each emitting different wavelengths of light. Also, a single light source can be utilized having an adjustable light projection angle or multiple light sources can be utilized each directed at different light projection angles relative to the user's position and the user's head-box and eye-box areas.

The various implementations and examples shown above illustrate a method and system for providing light exposure to mitigate the impact of rapid time zone changes. A user of the present method and system may choose any of the above implementations, or an equivalent thereof, depending upon the desired application. In this regard, it is recognized that various forms of the subject light exposure method and system could be utilized without departing from the spirit and scope of the present implementation(s).

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

A computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices also include an alphanumeric input device (e.g., a keyboard, touch screen), a cursor control device (e.g., a mouse), a drive unit, a signal generation device (e.g., a speaker) and a network interface device.

The drive unit can include a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device. The instructions can be used to control the user interface for the passenger when selecting the appropriate acclimation program. The passenger input interface can be a touch-screen LCD input device that provides inputs to a controller or other computing device that ultimately controls an electronic control interface of the light source.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed.

Other aspects, objects and advantages of the present technology as disclosed can be obtained from a study of the drawings, the disclosure and the appended claims.

What is claimed is:

1. A system for providing light exposure to mitigate the impact on a user in a vehicle of rapidly travelling across time zones comprising:
    a user area;
    a light emitting source configured to direct light into the user area, said light emitting source being adjustable for a plurality of lighting characteristics including a duration, an intensity level, a light projection angle, and a wavelength or combination of wavelengths; and
    a user interface configured to:
        receive a selection of a time zone from a plurality of selectable time zones;
        determine a plurality of parameters corresponding respectively to the plurality of lighting characteristics based on the selected time zone; and
        selectively control an adjustment of one or more of the plurality of lighting characteristics of the light emitting source using the plurality of parameters.

2. The system as recited in claim 1, where the light is directed to illuminate a predetermined area of the user area.

3. The system as recited in claim 2, where the predetermined area is one or more of a predetermined user head area and a predetermined user eye area.

4. The system as recited in claim 1, where the light source is configured with baffles designed to absorb a portion of the light projected outside of a predetermined area.

5. The system as recited in claim 1, where the selected time zone is one or more of a destination time zone, an origin time zone, or another time zone.

6. The system as recited in claim 1, where the wavelength of the light source includes one or more of a red, a blue and a green wavelength.

7. An aircraft incorporating the system of claim 1.

8. The system recited in claim 1, wherein:
the user area is one of a plurality of user areas in the vehicle;
the light emitting source is one of a plurality of light emitting sources;
the user interface is one of a plurality of user interfaces;
the plurality of light emitting sources respectively correspond to the plurality of the user areas;
the plurality of user interfaces respectively correspond to the plurality of the user areas; and
for individual user areas of the plurality of user areas:
the respective light emitting source is configured to emit a beam of light focused on the respective individual user area;
the respective user interface is configured to receive a respective selection of a time zone of a destination of a passenger in the respective individual user area; and
the respective user interface is configured to adjust parameters for lighting characteristics of the respective light emitting source based on a light exposure cycle at the destination of the passenger in the respective individual user area.

9. A method for providing light exposure to mitigate the impact of rapid travel across time zones on a user in a vehicle comprising:
directing light toward a user area using a light emitting source, the light emitting source being adjustable for a plurality of lighting characteristics including a duration, an intensity level, a light projection angle, and a light wavelength or combination of wavelengths;
receiving a selection of a time zone from a plurality of selectable time zones via a user interface device;
determining a plurality of parameters corresponding respectively to the plurality of lighting characteristics based on the selected time zone; and
selectively controlling an adjustment of one or more of the plurality of lighting characteristics of the light exposure using the plurality of parameters.

10. The method as recited in claim 9, where directing the light includes focusing the light into a beam to project and illuminate a predetermined area of the user area.

11. The method as recited in claim 10, where the predetermined area is one or more of a predetermined user head area and a predetermined user eye area.

12. The method as recited in claim 10, further comprising: baffling the beam of light with baffles designed to absorb a portion of the beam projected outside of a predetermined area.

13. The method as recited in claim 9, wherein the selected time zone is one or more of a destination time zone, a origin zone, or another time zone.

14. The method as recited in claim 9, where selectively controlling the adjustment of the light is based on a number of planned days in the selected time zone.

15. The method as recited in claim 9, further comprising: directing each of a plurality of lights to one or more of a plurality of passenger seating positions.

16. The method as recited in claim 9, where selectively controlling an adjustment of the light includes adjusting the light wavelength to one or more of a red, a blue and a green wavelength.

17. The method recited in claim 9, wherein:
the user area is one of a plurality of user areas in the vehicle;
the light emitting source is one of a plurality of light emitting sources;
the user interface is one of a plurality of user interfaces;
the plurality of light emitting sources respectively correspond to the plurality of the user areas;
the plurality of user interfaces respectively correspond to the plurality of the user areas; and
the method further comprises, for individual user areas of the plurality of user areas:
emitting from the respective light emitting source a beam of light focused on the respective individual user area;
receiving via the respective user interface a respective selection of a time zone of a destination of a passenger in the respective individual user area; and
adjusting parameters for lighting characteristics of the respective light emitting source based on a light exposure cycle at the destination of the passenger in the respective individual user area.

* * * * *